(12) United States Patent
Suzuki et al.

(10) Patent No.: US 9,506,540 B1
(45) Date of Patent: Nov. 29, 2016

(54) PEDAL APPARATUS

(71) Applicants: HONDA MOTOR CO., LTD.,
Minato-ku, Tokyo (JP);
HIRUTA-KOGYO CO., LTD.,
Kasaoka-shi, Okayama (JP)

(72) Inventors: Motomasa Suzuki, Wako (JP); Hiroshi Saito, Wako (JP); Junji Ishii, Kasaoka (JP); Yoshitaka Noda, Kasaoka (JP); Kenji Fujioka, Kasaoka (JP); Takurou Matsuda, Kasaoka (JP)

(73) Assignees: HONDA MOTOR CO., LTD.,
Minato-ku (JP); HIRUTA-KOGYO CO., LTD., Kasaoka-shi (JP)

( * ) Notice: Subject to any disclaimer, the term of this patent is extended or adjusted under 35 U.S.C. 154(b) by 0 days.

(21) Appl. No.: 14/982,190

(22) Filed: Dec. 29, 2015

(51) Int. Cl.
*G05G 1/30* (2008.04)
*F16H 21/44* (2006.01)
*G05G 1/44* (2008.04)

(52) U.S. Cl.
CPC ............... *F16H 21/44* (2013.01); *G05G 1/30* (2013.01); *G05G 1/44* (2013.01)

(58) Field of Classification Search
CPC .......... F16H 21/44; G05G 1/30; G05G 1/44; G05G 1/445; G05G 1/46; B60T 7/04; Y10T 74/20528
See application file for complete search history.

(56) References Cited

U.S. PATENT DOCUMENTS

| 4,989,474 A * | 2/1991 | Cicotte ..................... B60T 7/04 |
| | | 74/512 |
| 6,834,564 B2 * | 12/2004 | Huesges ................ B60K 26/02 |
| | | 74/513 |
| 7,219,576 B2 * | 5/2007 | Leonard ..................... B60T 7/06 |
| | | 74/512 |

FOREIGN PATENT DOCUMENTS

| JP | S57-151150 U | 9/1982 |
| JP | H04-116270 U | 10/1992 |
| JP | 2009-140230 A | 6/2009 |

* cited by examiner

*Primary Examiner* — Adam D Rogers
(74) *Attorney, Agent, or Firm* — Fox Rothschild LLP (57) ABSTRACT

There is provided a pedal apparatus in which connection bracket is prevented from falling off from a pedal arm even if there is a welding defect. A pedal apparatus includes a pedal arm provided with an inclined portion, an upper retaining hole, and a lower retaining hole passing therethrough. A connection bracket, having a connecting face, an upper attachment face, a lower attachment face, an upper retaining projection and a lower retaining projection, is coupled with the pedal arm, with the upper retaining projection and the lower retaining projection respectively passing through the upper retaining hole and the lower retaining hole. Each edge of the upper attachment face and the lower attachment face is welded to the inclined portion of the pedal arm.

4 Claims, 11 Drawing Sheets

PEDAL APPARATUS

TECHNICAL FIELD

The present invention relates to a pedal apparatus including a pedal arm and a push rod.

BACKGROUND ART

A push rod (a link rod) is generally employed in a pedal apparatus such as an accelerator pedal and a brake pedal. When a pedal is stepped on, swinging motion of the pedal arm is converted into a back-and-forth motion via a push rod, and is transmitted to a master cylinder. In a pedal apparatus disclosed in JP 2009-140230 A, for example, a push rod is connected to a connection shaft attached to a pedal arm. In a pedal apparatus disclosed in JP H04-116270 A or JP S57-151150, a push rod is connected to a connection shaft held between a pedal arm and a connection bracket attached to the pedal arm.

SUMMARY OF INVENTION

Problems to be Solved by the Invention

If a pedal arm is swung, a push rod moves back and forth with a slight vertical displacement since a connection point between the pedal arm and the push rod track an arc-shaped trajectory. The push rod transmits a back-and-forth motion to a master cylinder while it moves two dimensionally, namely in a back-and forth direction and vertical direction. However, due to a structural restriction such as layout of parts, a portion inclined left or right has to be provided on the pedal arm. In such case, the push rod is connected to an inclined portion. If the push rod is attached to the inclined portion of the pedal arm, the connection point of the push rod and the pedal arm also displaces in a left-and-right direction in addition to the vertical direction while moving back and forth.

Alternatively, a bracket may be provided on the inclined portion of the pedal arm to connect the push rod thereto. In this case, the push rod is connected only to the connection bracket unlike a pedal apparatus disclosed in JP H04-116270 A or JP S57-151150 A. If the connection bracket should come off the pedal arm, the pedal arm and the push rod separates to lose a control of a master cylinder.

A connection bracket is typically fixed to a pedal arm by welding as described in, for example, paragraph [0021] of JP H04-116270 A. If there should be a defect in the welding, the bracket might fall off to lose control of the master cylinder. The present invention aims to provide a pedal apparatus in which the bracket is prevented from falling off even if there is a defect in welding.

Means to Solve the Problems

The present invention provides a pedal apparatus including: a pedal arm swingable back and forth around a horizontal pivot shaft, the pedal arm provided with an inclined portion inclined in an extending direction of the pivot shaft; a connection bracket attached to the inclined portion of the pedal arm; and a push rod connected to the connection bracket. The pedal arm is provided with an upper retaining hole and a lower retaining hole, each passing through the inclined portion of the pedal arm. The connection bracket includes: a connecting face parallel to a virtual plane perpendicular to the pivot shaft; an upper attachment face extending from an upper edge of the connecting face; a lower attachment face extending from a lower edge of the connecting face; an upper retaining projection extending from an edge of the upper attachment face; and a lower retaining projection extending from an edge of the lower attachment face. The pedal arm and the connection bracket are coupled in a state that the upper retaining projection and the lower retaining projection respectively pass through the upper retaining hole and the lower retaining hole. Each of the edge of the upper attachment face and the edge of the lower attachment face of the connection bracket is contacted with the inclined portion of the pedal arm and is fixed thereto by welding. The connection bracket is thereby prevented from falling off the pedal arm, if a welded joint between the inclined portion of the pedal arm and the connection bracket should break.

In a preferred embodiment, the connecting face of the connection bracket is located on an upper side of the inclined portion of the pedal arm. The upper retaining projection and the lower retaining projection respectively pass through the upper retaining hole and the lower retaining hole from an upper side of the pedal arm. The upper retaining projection and the lower retaining projection are thereby prevented from coming off respectively from the upper retaining hole and the lower retaining hole.

In a preferred embodiment, at least either one of the upper retaining projection and the lower retaining projection is folded or curved in shape. The upper retaining projection and the lower retaining projection are thereby further prevented from coming off respectively from the upper retaining hole and the lower retaining hole.

In a preferred embodiment, at least either one of an opening of the upper retaining hole and an opening of the lower retaining hole is larger than a cross-section of the upper retaining projection or a cross-section of the lower retaining projection. If a welded joint between the inclined portion of the pedal arm and the connection bracket should break, a collision noise sounds to help a driver notice the problem.

The pedal apparatus includes the connection bracket provided with the upper retaining projection and the lower retaining projection, respectively passing through the upper retaining hole and the lower retaining hole provided on the inclined portion of the pedal arm. According to this, the connection bracket is prevented from falling off from the pedal arm, and thereby the push rod connected to the connection bracket remains controllable even if a welded joint between the inclined portion of the pedal arm and the connection bracket should break.

DESCRIPTION OF EMBODIMENTS

Figure 1:
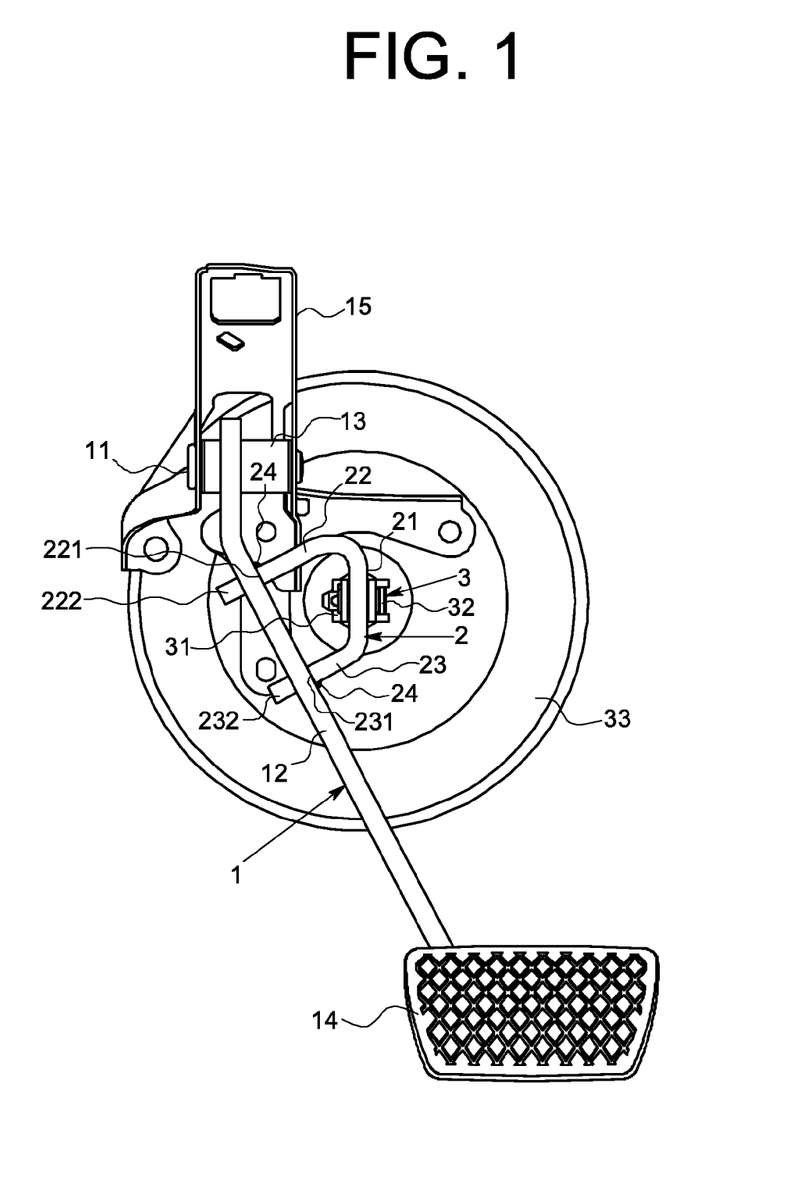
FIG. 1 is a front view illustrating a pedal apparatus of one embodiment.
Figure 2:
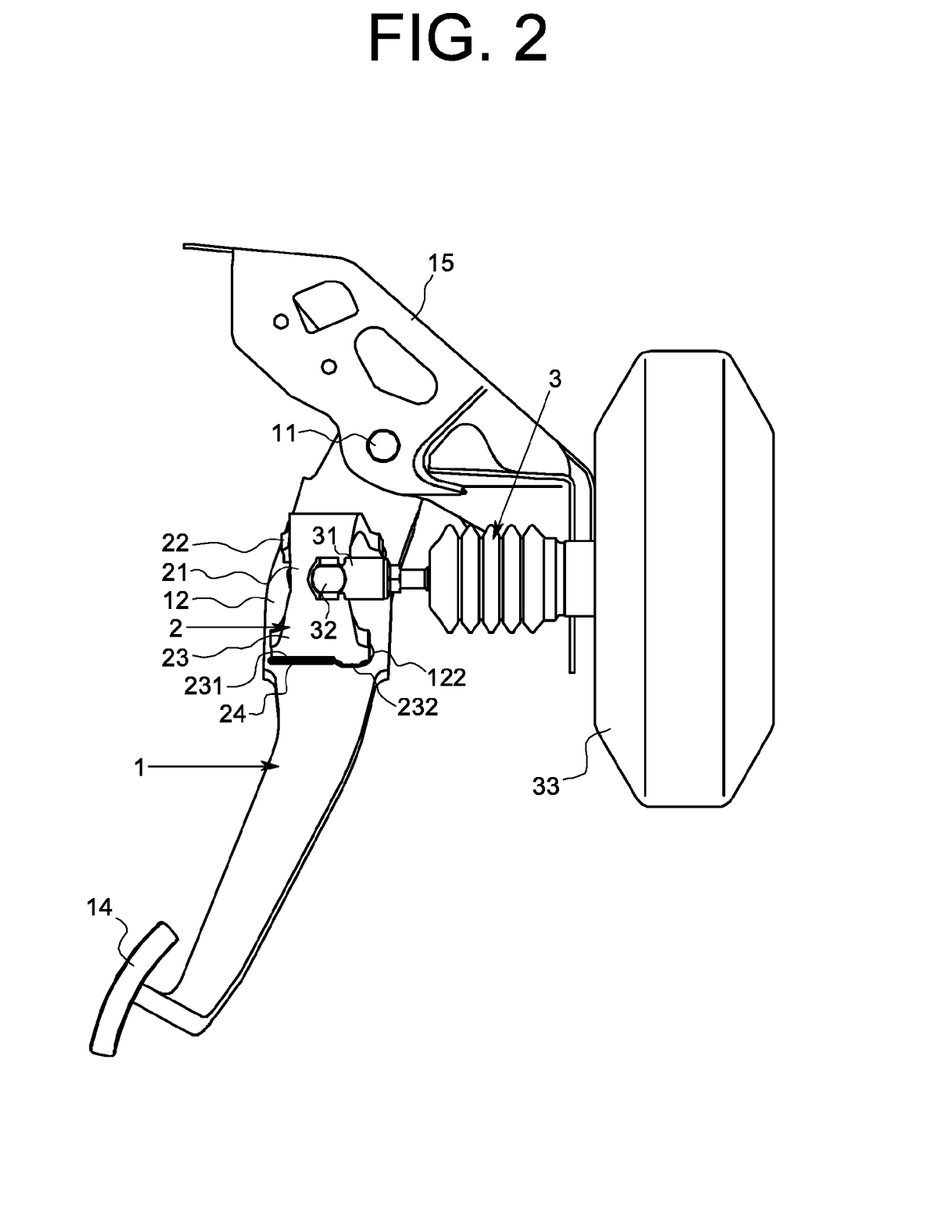
FIG. 2 is a right side view of the pedal apparatus of FIG. 1.

Embodiments of the present invention are described with reference to Figs. However, the present invention is not limited to the embodiments. Modifications and variations may be made within the scope and spirit of the present invention as described and as defined in the claims. One embodiment of the present invention is illustrated in FIG. 1 and FIG. 2. A pedal apparatus of the present embodiment includes a pedal arm 1 which is pivotally swingable back and forth around a horizontal pivot shaft 11. The pedal arm 1 is provided with an inclined portion 12 bent in an extending direction of the pivot shaft 11. In this embodiment, the extending direction of the pivot shaft 11 corresponds to left and right directions facing the paper surface in FIG. 1, and to a side of a reader facing the paper in FIG. 2. A connection bracket 2 is attached to the inclined portion 12 of the pedal arm 1. The connection bracket 2 includes a connecting face 21 parallel to a virtual plane perpendicular to the pivot shaft 11. The connecting face 21 is connected to a push rod 3. The push rod 3 is extending from a master cylinder 33 fixed to a body of a vehicle. The body of the vehicle is not illustrated here. In this description, "front" is defined as a direction of forward movement of the vehicle seen from a driver, and "back" is the opposite of the front. "Right" and "left" are respectively defined as right-hand side and left-hand side of the driver.

The pedal arm 1 is made of a metal plate bent to the right immediately under the pivot shaft 11. The inclined portion 12 is extending straight from the bending point. A pedal pad 14 is attached to a lower end of the inclined portion 12. The pedal arm 1 is pivotally attached to an attachment bracket 15 by the pivot shaft 11, and is installed to the body side of the vehicle via the attachment bracket 15. The attachment bracket 15 is made of a metal plate with "C-shaped" cross-section, including a pair of opposing, parallel flanges. In this description, "C-shape" is refers to a shape having a pair of opposing surfaces and another one surface bridging a pair of opposing edges of the pair of opposing surfaces. The pivot shaft 11 passes through a bearing pipe 13 piercing an upper end of the pedal arm 1. Each end of the pivot shaft 11 is supported by the attachment bracket 15. The pedal arm 1 swings forward when the pedal pad 14 is stepped on. When the pedal pad 14 is released, the pedal arm 1 swings backward and return to the original position. The pedal arm 1 returns by a returning mechanism such as a coil spring built in the pivot shaft 11.

Figure 3:
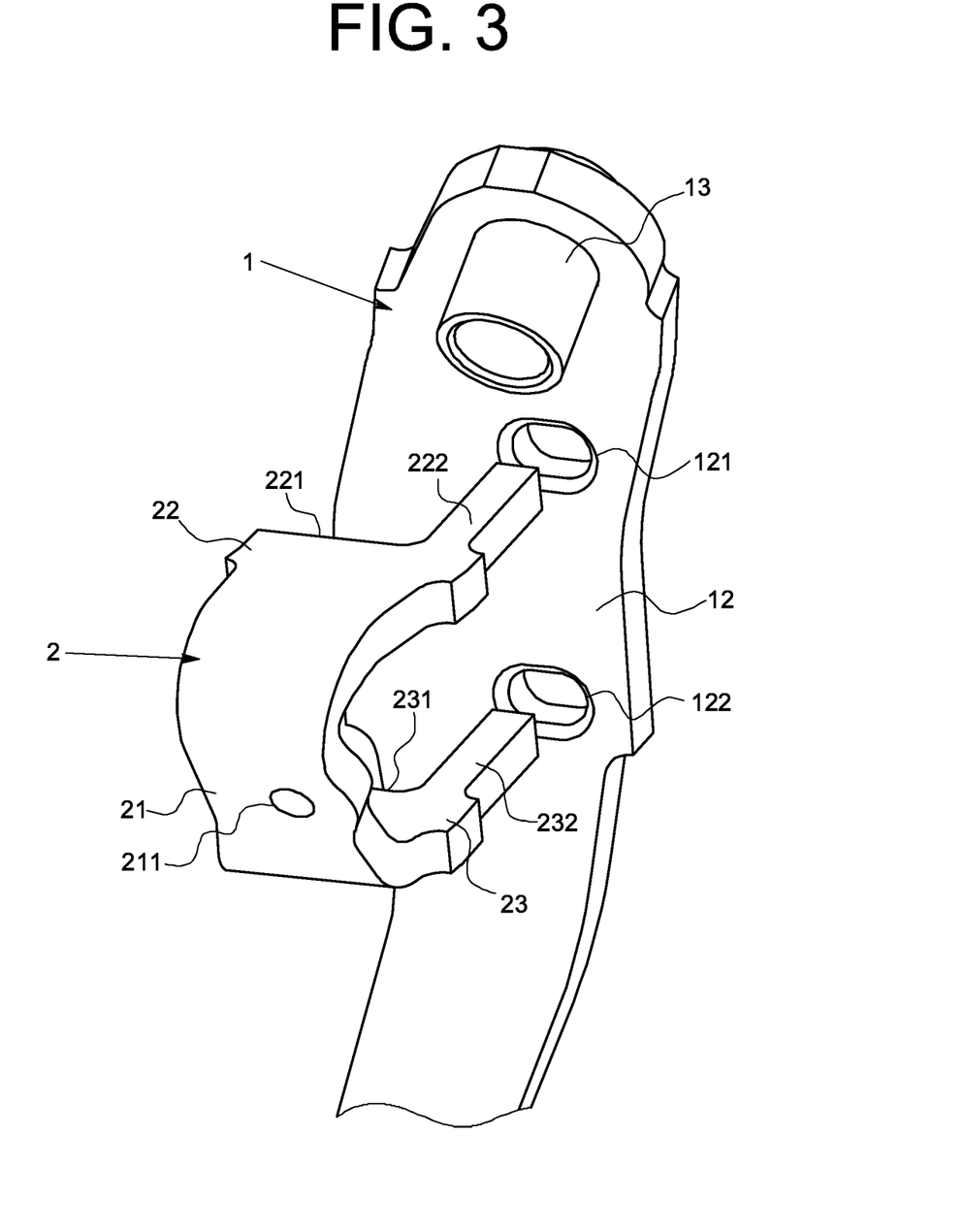
FIG. 3 is a perspective view illustrating a state attaching the connection bracket is about to be attached to a pedal arm, according to the pedal apparatus of FIG. 1.
Figure 6:
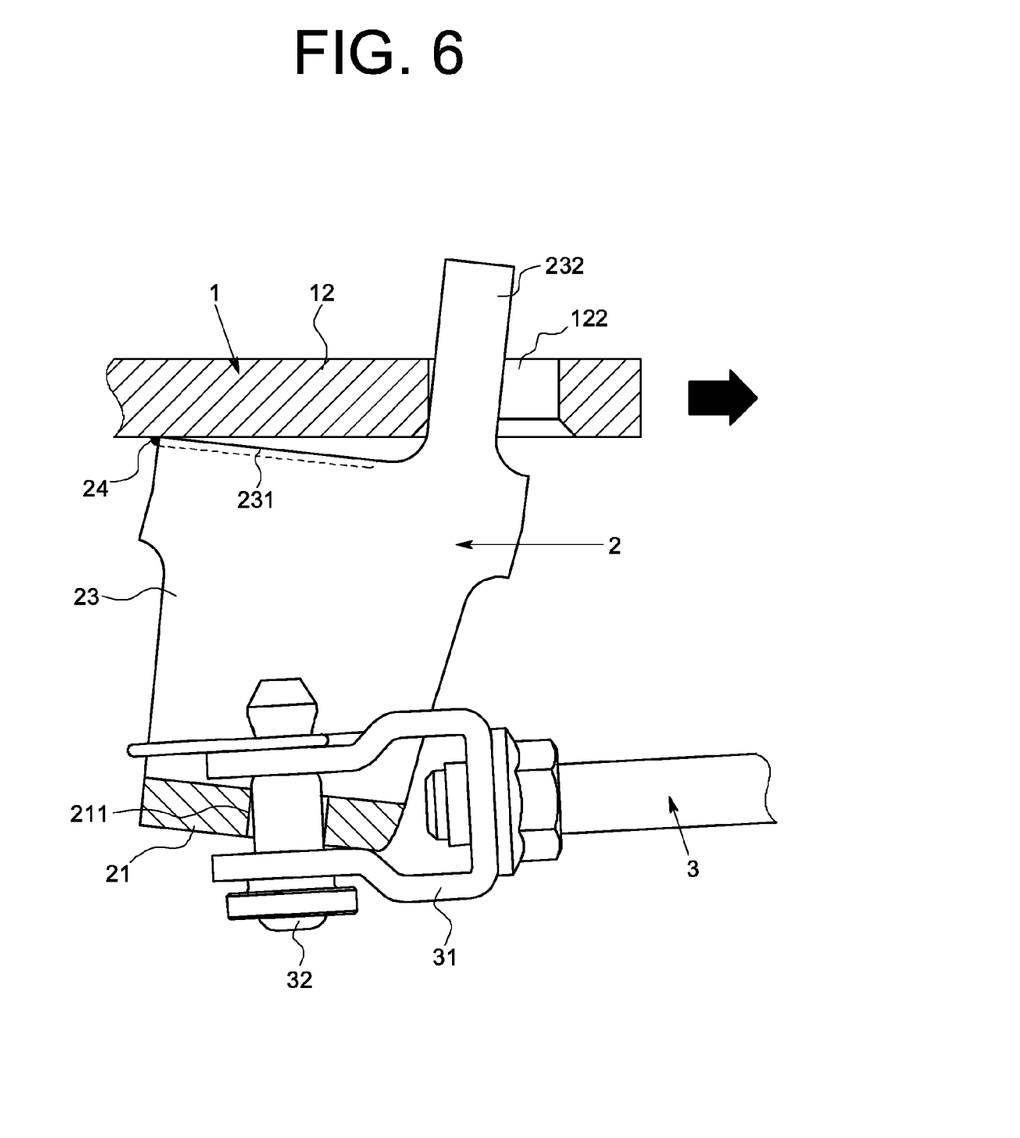
FIG. 6 is a partial cross sectional view illustrating a state the connection bracket disjointed from the pedal arm pushing the push rod, according to the pedal apparatus of FIG. 1.
Figure 7:
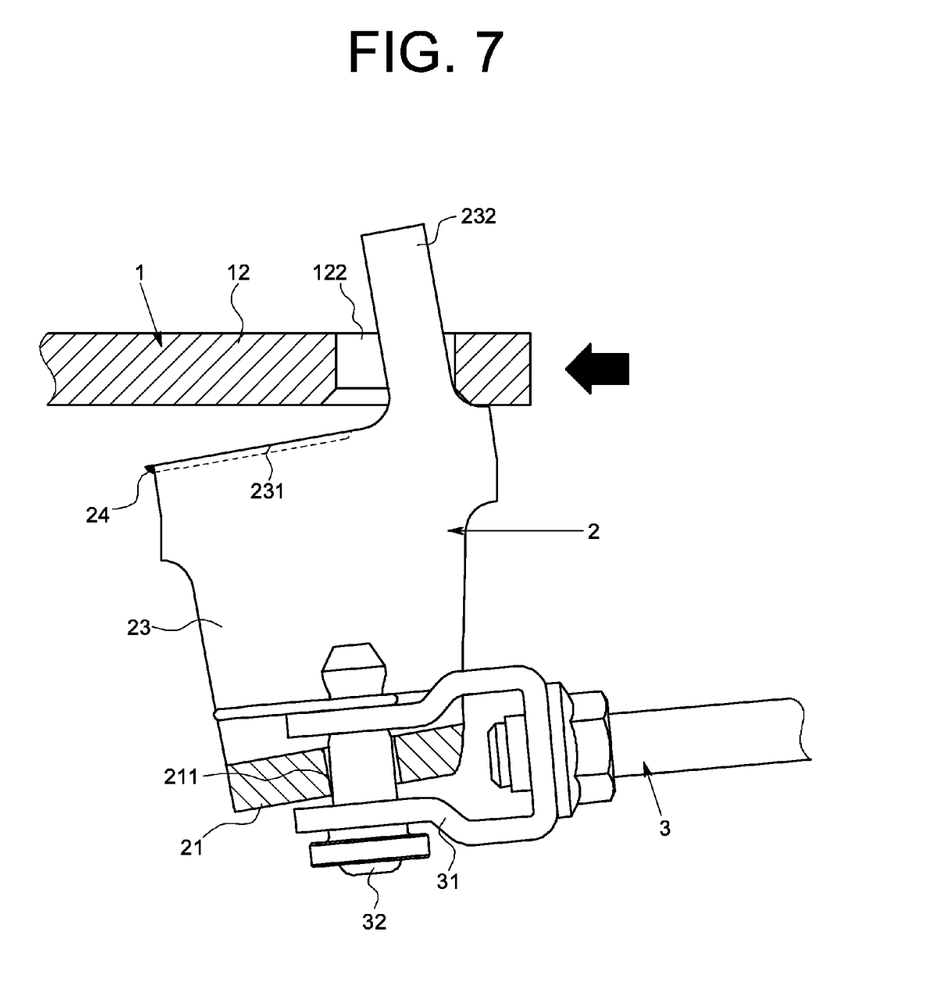
FIG. 7 is a partial cross sectional view illustrating a state the connection bracket disjointed from the pedal arm pulling the push rod, according to the pedal apparatus of FIG. 1.

As illustrated in FIG. 3, the pedal arm 1 is provided with an upper retaining hole 121 and a lower retaining hole 122 near the upper end of the inclined portion 12. Each hole passes through the inclined portion 12. The upper retaining hole 121 and the lower retaining hole 122 are parallel arranged along the extending direction spacing a prescribed interval. The upper retaining hole 121 and the lower retaining hole 122 are similar in shape, pass through the pedal arm 1, and are long holes of which longer sides lie in the front and back direction. A circumferential edge of the upper retaining hole 121 and an opening of the lower retaining hole 122 are chamfered on a side from which an upper retaining projection 222 and a lower retaining projection 232 of the connection bracket 2 is to be inserted. However, the upper retaining hole 121 and the lower retaining hole 122 are to be arranged in the same position in back and forth, or to be arranged in shifted position in back and forth. For example, the upper retaining hole 121 and the lower retaining hole 122 are to be different in size or shape from each other. Each shape of the opening of the upper retaining hole 121 and the opening of the lower retaining hole 122 is not limited as long as each of them is respectively larger than a cross-section of the upper retaining projection 222 and a cross-section of the lower retaining projection 232. For example, as for a size of the opening of the upper retaining hole 121 and the opening the lower retaining hole 122, a vertical width of each opening is nearly the same as respective vertical widths namely thicknesses of the upper retaining projection 222 and the lower retaining projection 232. A width of each opening in back-and-forth direction is larger than respective widths of the upper retaining projection 222 and the lower retaining projection 232. According to this configuration, if a welded joint between the pedal arm 1 and the connection bracket 2 should break, the connection bracket 2 is tilted in specified direction with respect to the pedal arm 1 as illustrated in FIG. 6 and FIG. 7.

In the present embodiment, the opening of the upper retaining hole 121 and the opening of the lower retaining hole 122 are respectively wider in back-and-forth direction than the cross-section of the upper retaining projection 222 and the cross-section of the lower retaining projection 232. If a welded joint between the pedal arm 1 and the connection bracket 2 should break, the upper retaining projection 222 and the lower retaining projection 232 become movable respectively within the range of the width of the upper retaining hole 121 and the lower retaining hole 122. This makes a collision noise by, for example colliding an edge of the upper attachment face 221 and edge of the lower attachment face 231 with the inclined portion 12, and colliding the upper retaining projection 222 and the lower retaining projection 232 with the inner circumferential surface of the upper retaining hole and the lower retaining hole 122. The collision noise will help the driver notice early that the connection bracket 2 is disjointed from the pedal arm 1, and to recognize danger and necessity of repair.

As illustrated in FIG. 3, the connection bracket 2 is a member made of a metal plate including a connecting face 21 parallel to a virtual plane perpendicular to the pivot shaft 11, an upper attachment face 22 bent to the left at an upper edge of the connecting face 21 and extending therefrom, and lower attachment face 23 bent also to the left at a lower edge of the connecting face 21 and extending therefrom. "The virtual plane perpendicular to the pivot shaft 11" is parallel to a pivot plane of the pedal arm 1. The virtual plane is a vertical plane in the present embodiment. The pivot plane of the pedal arm 1 is a plane that includes a trajectory of swinging motion of the pedal arm. If a pedal arm 1 is swung, connecting face 21 moves back and forth while a vertically displacing without tilting its surface. The push rod 3 connected to the connecting face 21, therefore, transmits aback-and-forth motion to the master cylinder without displacing left and right. The upper attachment face 22 and the lower attachment face 23 are not limited in shape or size as long as they are capable of attaching the connection bracket 2 to the inclined portion 12 of the pedal arm 1. The upper retaining projection 222 is extending from an edge 221 of the upper attachment face 22. The lower retaining projection 232 is extending from an edge 231 of the lower attachment face 23. Although the connecting face 21, the upper attachment face 22, the lower attachment face 23, the upper retaining projection 222 and the lower retaining projection 232 are integrated with each other in the present embodiment, for example, one or all of these members are to be independently made and connected each other.

Figure 5:
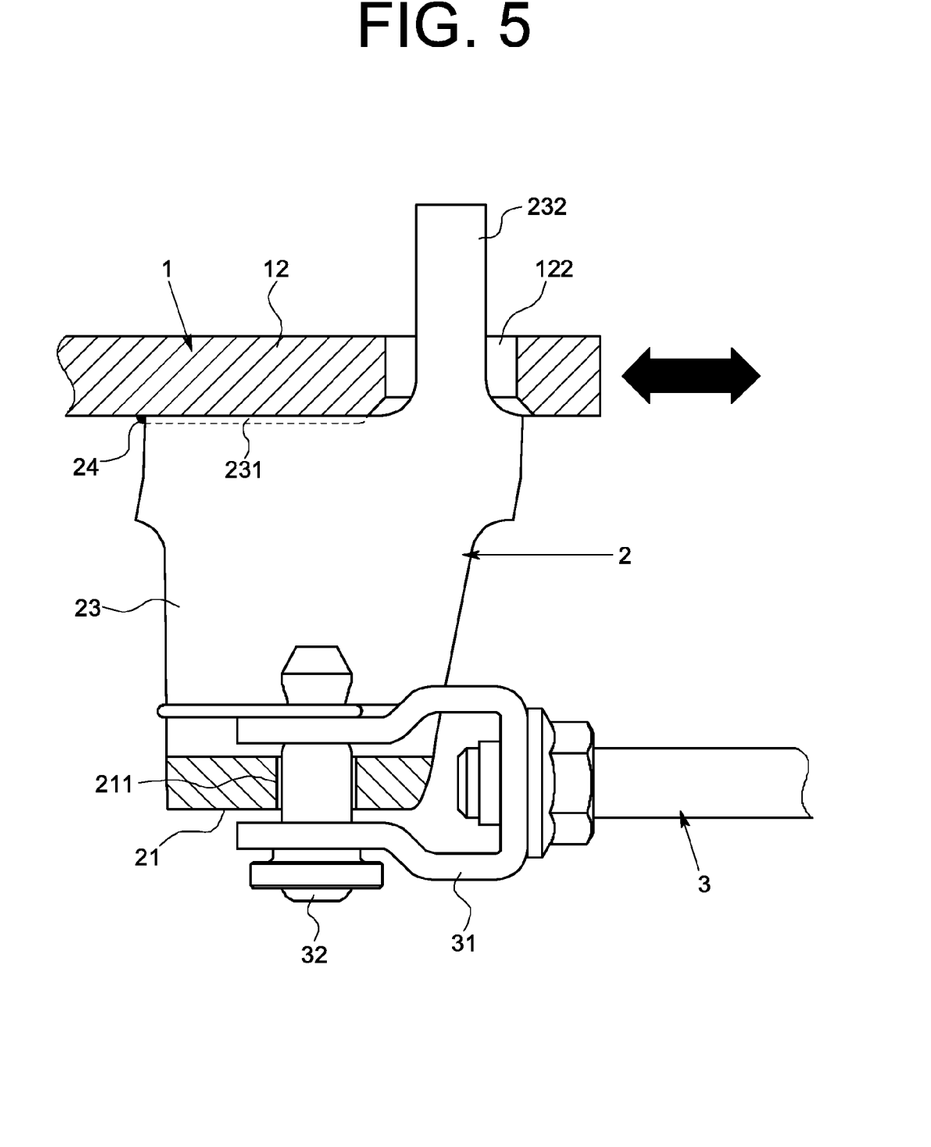
FIG. 5 is a partial cross sectional view illustrating a state the connection bracket and fixed to the pedal arm pulling and pushing a push rod, according to the pedal apparatus of FIG. 1.

In the present embodiment, the push rod 3 is axially attached to the connecting face 21 in the manner described below. As illustrated in FIG. 1, FIG. 2 and FIG. 5, the connecting face 21 is provided with a connecting hole 211 passing therethrough and provided on the approximate vertical center thereof. A connecting pin 32 passes through the connecting hole 211 from the right side in parallel with the pivot shaft 11. An end of the connecting pin 32 sticking out on the other side of the connecting face 21 is retained by engaging a split pin. Each end of the connecting pin 32 is supported by a bracket 31. The bracket 31 is C-shape in plain view, sandwiching the connecting face 21. A rear end of the push rod 3 is attached to a front portion of the bracket 31.

The upper retaining projection 222 is extending in left direction from front side of the edge 221 of the upper attachment face 22. The lower retaining projection 232 is extending in left direction from front side of the edge 231 of the lower attachment face 23. In the present embodiment, each of the upper retaining projection 222 and the lower retaining projection 232 is twice as long as a thickness of the connecting face 21 or longer, and is a cuboid shape with a rectangular cross-section. Each of the upper retaining projection 222 and the lower retaining projection 232 respectively passes through the upper retaining hole 121 and the lower retaining hole 122 from the upper right, in an approximately perpendicular direction to the connecting face 21. A length of the upper retaining projection 222 and the lower retaining projection 232 are not particularly limited. For example, the length of each of the upper retaining projection 222 and the lower retaining projection 232 are to be to an extent that each at least sticks out on the other side of the inclined portion 12 in a state that each is inserted into the upper retaining hole 121 and the lower retaining hole 122. Each of the upper retaining projection 222 and the lower retaining projection 232 is preferred to be longer so that each is less likely to come off the upper retaining hole 121 and the lower retaining hole 122. Lengths of the upper retaining projection 222 and the lower retaining projection 232 are to be either the same or different.

In the present embodiment, an upper face and a lower face of the upper retaining projection 222 respectively slidably contact with an upper side of the inner circumferential face and a lower side of the inner circumferential face of the upper retaining hole 121. An upper face and a lower face of the lower retaining projection 232 respectively slidably contact with an upper side of the inner circumferential face and a lower side of inner circumferential face of the lower retaining hole 122. A front face and a back face of the upper retaining projection 222 are respectively apart from an front side of the inner circumferential face and a back side of the inner circumferential face of the upper retaining hole 121. A front face and a back face of the lower retaining projection 232 are respectively apart from an front side of the inner circumferential face and a back side of the inner circumferential face of the lower retaining hole 122. Therefore, if a welded joint between the pedal arm 1 and the connection bracket 2 breaks and the pedal arm swings, the connection bracket 2 displaces mainly in back-and-forth direction with respect to the pedal arm 1. At least one of the upper retaining projection 222 and the lower retaining projection 232 is engaged on the front side of the inner circumferential face or the back side of the inner circumferential face of the upper retaining hole 121 and the lower retaining hole 122. This prevents the connection bracket 2 from falling off the pedal arm 1.

Figure 4:
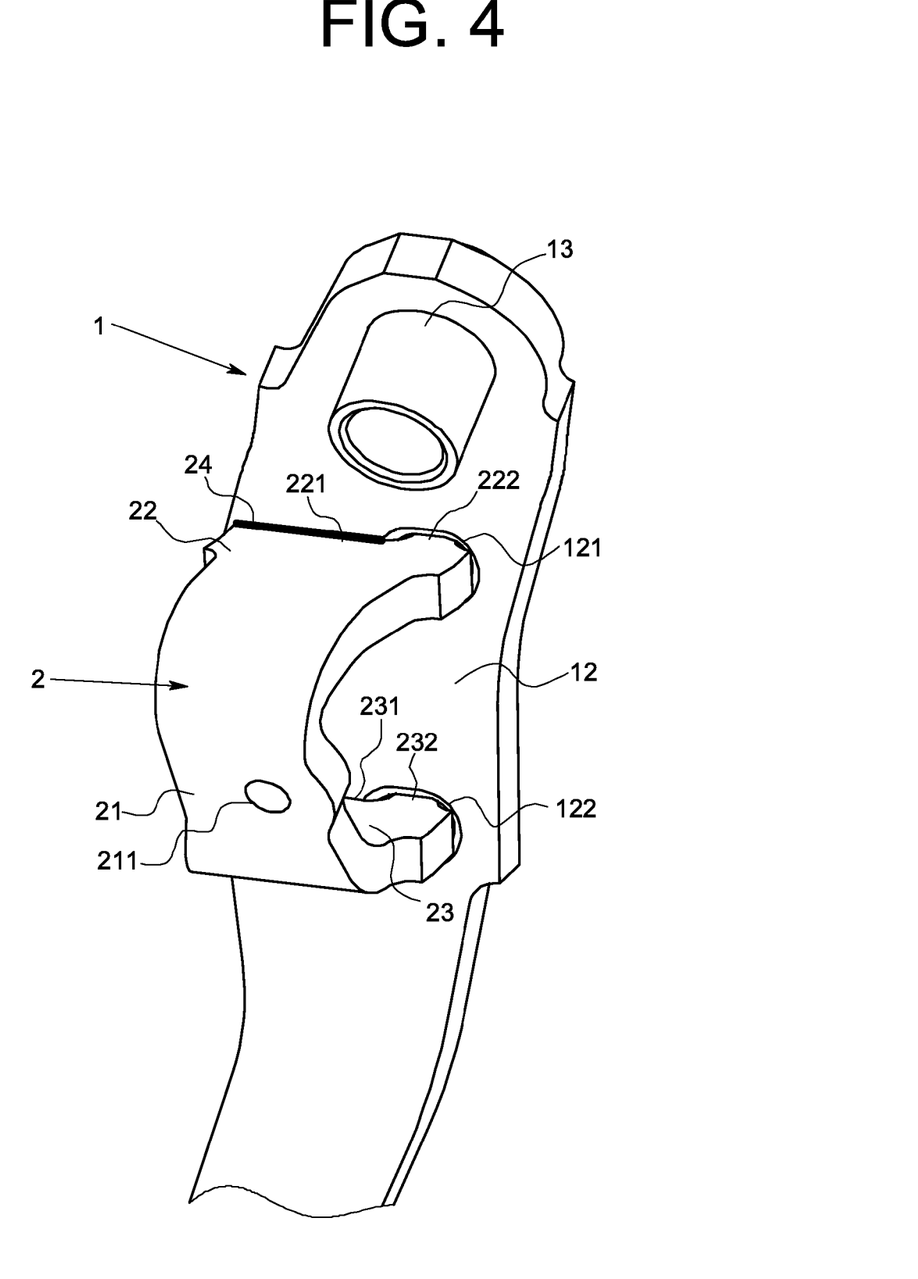
FIG. 4 is a perspective view illustrating a state complete attaching the connection bracket is about to be attached to the pedal arm, according to the pedal apparatus of FIG. 1.

FIG. 4 illustrates a state in which the connection bracket 2 is attached to the pedal arm 1. In the present embodiment, each of the upper retaining projection 222 and the lower retaining projection 232 is inserted into the upper retaining hole 121 and the lower retaining hole 122 from the upper right side of the connecting face 21. Although the connection bracket 2 is to be attached to either upper face side or lower face side of the inclined portion 12 of the pedal arm 1, the connection bracket 2 is preferred to be attached on the upper face side of the inclined portion 12 of the pedal arm 1. In this configuration, insertion direction of the upper retaining projection 222 and the lower retaining projection 232 includes a vector component parallel to gravity, thereby the upper retaining projection 222 and the lower retaining projection 232 are respectively prevented from falling off the upper retaining hole 121 and the lower retaining hole 122. In the present embodiment, each of the edge 221 of the upper attachment face and the edge 231 of the lower attachment face abuts to the upper face of the inclined portion 12, and the upper face side of the inclined portion 12 and the both edges are fillet welded. A weld bead 24 is formed on a portion where weld jointed. The weld bead 24 is formed between the upper face of the inclined portion 12 and a back side of the edge of the upper attachment face 221 behind the upper retaining projection 222, and between the upper face of the inclined portion 12 and a back side of the edge of the lower attachment face 231 behind the lower retaining projection 232. The weld bead 24 on the edge of the lower attachment face 231 is illustrated in FIG. 2.

If the connection bracket 2 is firmly fixed to the pedal arm 1 by welding, back-and-forth swinging motion of the pedal arm 1 is transmitted to the push rod 3 via the connection bracket 2 as illustrated in FIG. 5. The connecting face 21 of the connection bracket 2 where the push rod 3 is connected is parallel to the virtual plane perpendicular to the pivot shaft 11. A connection point between the connecting face 21 and the push rod 3 therefore tracks a circular trajectory parallel to the virtual plane. Thus the swinging motion of the pedal arm 1 is converted into back-and-forth motion of the push rod 3 without torsion.

If the welded joint between the pedal arm 1 and the connection bracket should break due to some problems such as a welding defect and both of the upper retaining projection 222 and the lower retaining projection 232 of the connection bracket 2 come off respectively of the upper retaining hole 121 and the lower retaining hole 122, the connection bracket 2 would fall off the pedal arm 1. However, if the pedal pad 14 is stepped on and the pedal arm 1 swings back and forth, the upper retaining projection 222 and the lower retaining projection 232 respectively tilt in back-and-forth direction with respect to the inclined portion 12 of the pedal arm 1 to prevent from coming off the upper retaining hole 121 and the lower retaining hole 122. More in detail, if the pedal arm 1 swings forward, the upper retaining projection 222 and the lower retaining projection 232 of the connection bracket 2 tilt forward as illustrated in FIG. 6. At least one of the upper retaining projection 222 and the lower retaining projection 232 engage with, for example, the back side of the inner circumferential face of the upper retaining hole 121 and the lower retaining hole 122. The upper retaining projection 222 and the lower retaining projection 232 are thereby prevented from coming off the upper retaining hole 121 and the lower retaining hole 122. Meanwhile, if the pedal arm 1 swings backward, the upper retaining projection 222 and the lower retaining projection 232 of the connection bracket 2 tilt backward as illustrated in FIG. 7. At least one of the upper retaining projection 222 and the lower retaining projection 232 engages with, for example, the front side of the inner circumferential face of the upper retaining hole 121 and the lower retaining hole 122. The upper retaining projection 222 and the lower retaining projection 232 are thereby prevented from coming off the upper retaining hole 121 and the lower retaining hole 122. Thus, the connection bracket 2 is prevented from falling off the pedal arm 1 if the welded joint between the pedal arm 1 and the connection bracket 2 should break. This falling-off prevention mechanism is also advantageous in terms of cost.

If the welded joint between the inclined portion 12 of the pedal arm 1 and the connection bracket 2 should break, the connection bracket 2 still follows the swinging motion of the pedal arm 1, though incompletely compared to when it is fixed to the pedal arm 1. The swinging motion of the pedal arm 1 therefore still converted into back-and-forth motion of the push rod 3. In other words, the pedal apparatus does not lose its function immediately after the breakage of the welded joint between the pedal arm 1 and the connection bracket 2. Since the connection bracket 2 is disjointed from the pedal arm 1 and is movable to some extent thereto, the driver would feel strange when stepping on the pedal apparatus. This will help the driver notice the problem at an early time.

If the welded joint between the pedal arm 1 and the connection bracket 2 should break and the pedal arm 1 is swung, the upper retaining projection 222 and the lower retaining projection 233 of the connection bracket 2 tilt in back-and-forth direction with respect to the pedal arm 1. The edge of the upper attachment face 221 and the edge of the lower attachment face 231 collide with the inclined portion 12, and the upper retaining projection 222 or the lower retaining projection 232 respectively collide with the inner circumferential surface of the upper retaining hole or the lower retaining hole 122, to make the collision noise. This will help a driver notice the problem at an early time.

Figure 8:
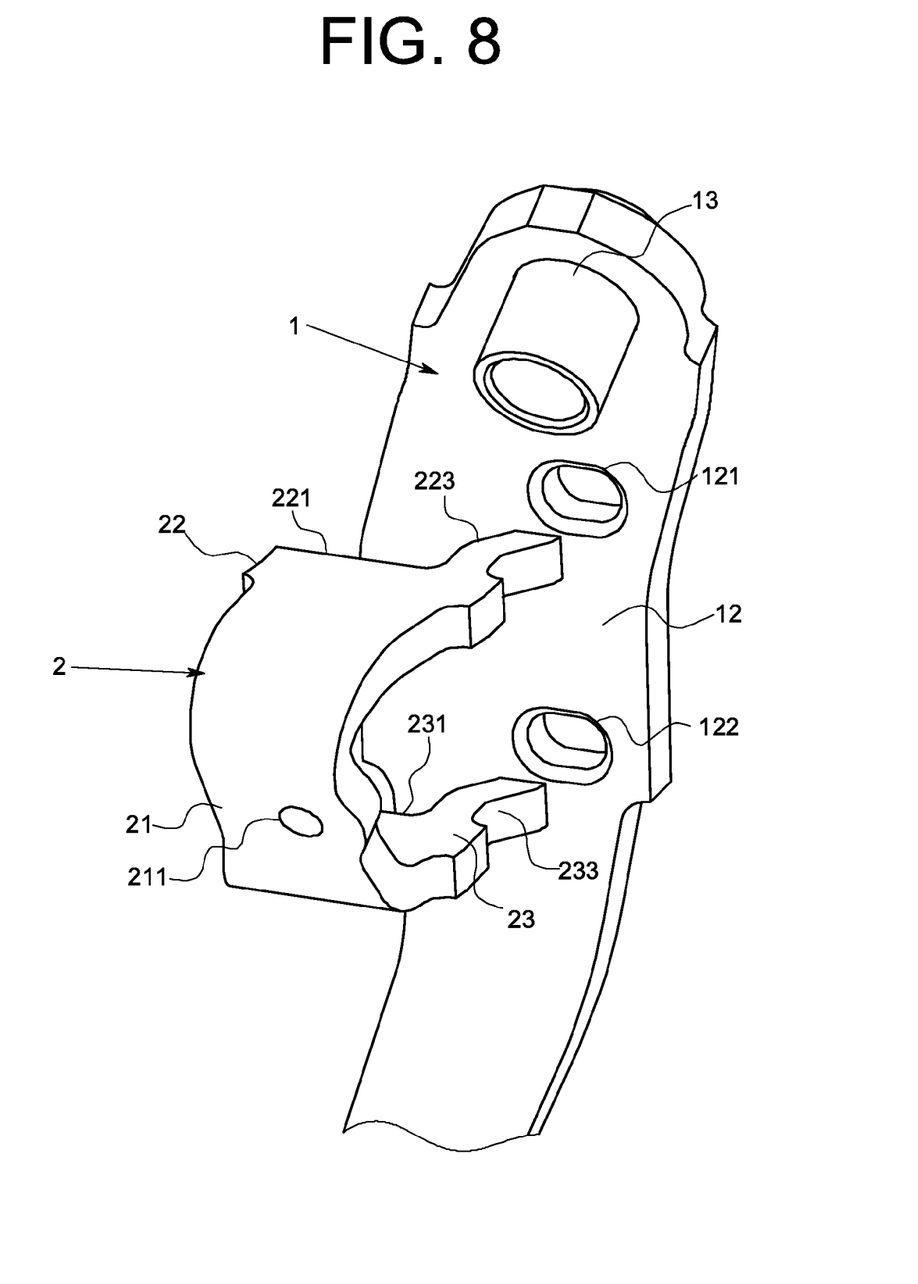
FIG. 8 is a partial perspective view illustrating a pedal apparatus of another embodiment in which a connection bracket is about to be attached to a pedal arm.

FIG. 8 is a perspective view illustrating another embodiment of the present invention. In the embodiment illustrated in FIG. 8, each of the upper retaining projection 223 and the lower retaining projection 233 is bent toward the front. The upper retaining projection 223 and the lower retaining projection 233 are twice as long as the thickness of the connecting face 21 or longer. If the welded joint between the pedal arm 1 and the connection bracket 2 should break, a bent portion of the upper retaining projection 223 or the lower retaining projection 233 hooks to the upper retaining hole or the lower retaining hole 122 to more effectively prevent the connection bracket from being fallen off the pedal arm 1. At least one of the upper retaining projection 222 and the lower retaining projection 232 is folded or curved. Direction of folding or curving of each of the upper retaining projection 223 and the lower retaining projection 233 is not particularly limited. The direction of folding or curving is preferred to be either forward or backward, in which the connection bracket 2 tilts, and further preferred to be forward. Directions and/or degrees of folding or curving of the upper retaining projection 223 and the lower retaining projection 233 is to be the same or different.

Figure 9:
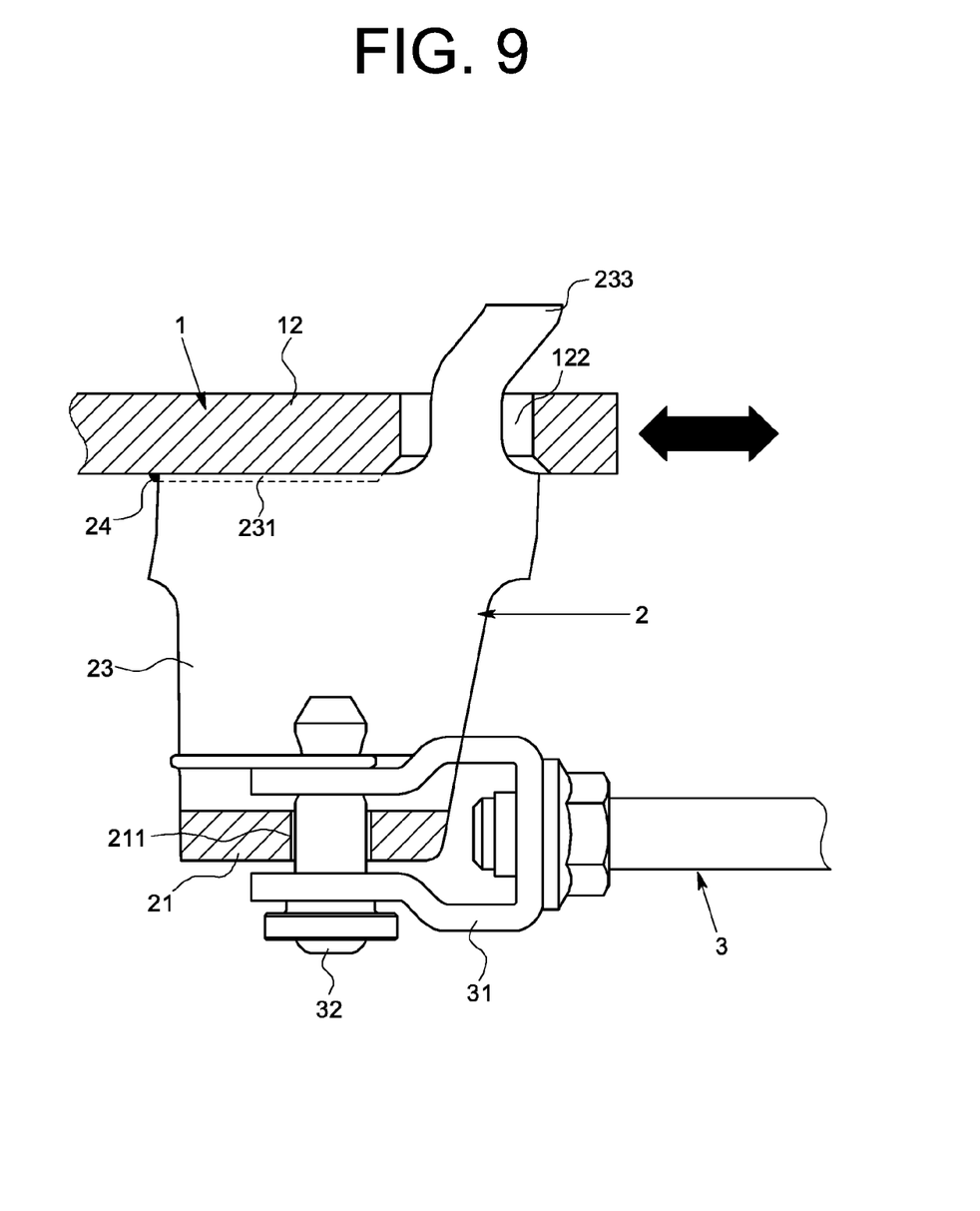
FIG. 9 is a partial cross sectional view illustrating a state the connection bracket fixed to the pedal arm pushing a push rod, according to the pedal apparatus of FIG. 8.
Figure 10:
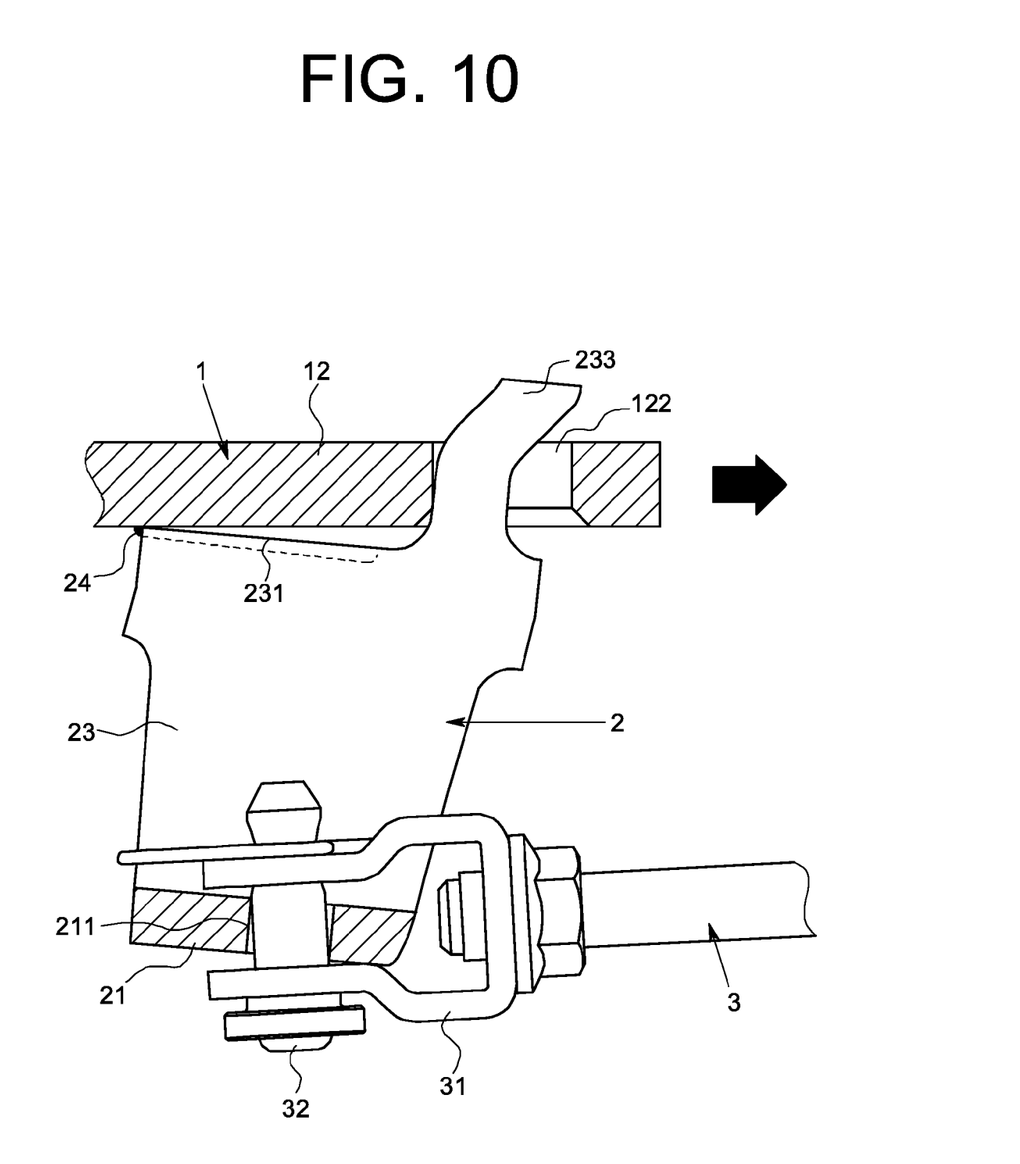
FIG. 10 is a partial cross sectional view illustrating a state the connection bracket disjointed from the pedal arm pulling and pushing a push rod, according to the pedal apparatus of FIG. 8.
Figure 11:
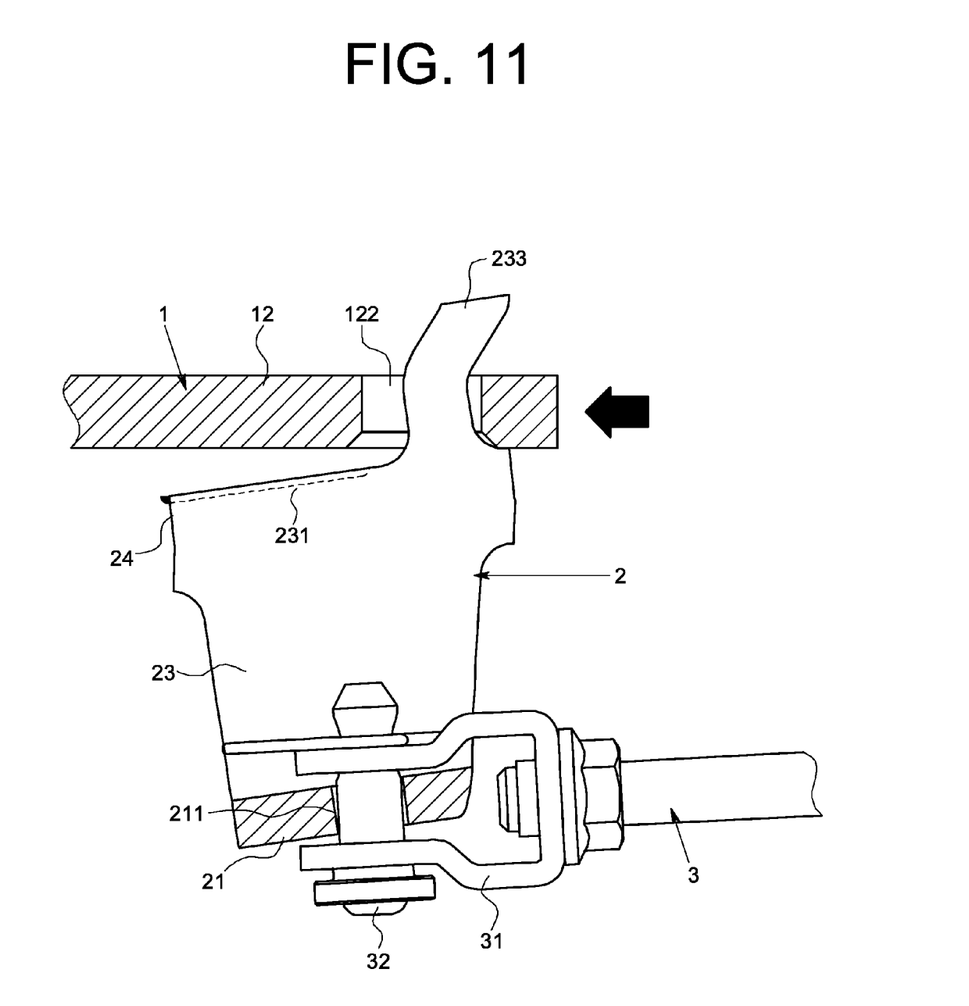
FIG. 11 is a partial cross sectional view illustrating a state the connection bracket disjointed from the pedal arm pulling a push rod, according to the pedal apparatus of FIG. 8.

In the embodiment illustrated in FIG. 8, the connection bracket 2 is fixed to the pedal arm 1 by fillet welding the edge 221 of the upper attachment face and the edge of the lower attachment face to the pedal arm 1 as illustrated in FIG. 9. If the welded joint between the pedal arm 1 and the connection bracket 2 should break due to some problems the connection bracket 2 is prevented from falling off the pedal arm 1 by having its upper retaining projection 223 and lower retaining projection 233 engage respectively with the inner circumferential surface of the upper retaining hole 121 and the lower retaining hole 122 as illustrated in FIG. 10 and FIG. 11.

The pedal apparatus of the embodiment illustrated in FIG. 8 does not immediately lose its function if the welded joint between the pedal arm 1 and the connection bracket 2 should break, as in the pedal apparatus of the embodiment illustrated in from FIG. 1 to FIG. 7. The two embodiments are also the same in that the driver is notified of the problem by the strangeness upon stepping on the pedal and the collision noise.

What is claimed is:
1. A pedal apparatus comprising:
 a pedal arm swingable back and forth around a horizontal pivot shaft,
 the pedal arm provided with an inclined portion inclined in an extending direction of the pivot shaft;
 a connection bracket attached to the inclined portion of the pedal arm and connected to a push rod; and
 wherein the pedal arm is provided with an upper retaining hole and a lower retaining hole, each passing through the inclined portion of the pedal arm, the connection bracket includes:
  a vertically arranged connecting face;
  an upper attachment face extending from an upper edge of the connecting face;
  a lower attachment face extending from a lower edge of the connecting face;
  an upper retaining projection extending from an edge of the upper attachment face;
  a lower retaining projection extending from an edge of the lower attachment face;
 and wherein the pedal arm and the connection bracket are coupled in a state that the upper retaining projection and the lower retaining projection respectively pass through the upper retaining hole and the lower retaining hole, a length of each of the upper retaining projection and the lower retaining projection is an extent that each at least sticks out on the other side of the inclined portion in a state that each is inserted into the upper retaining hole and the lower retaining hole, each of the edge of the upper attachment face and the edge of the lower attachment face of the connection bracket is contacted with the inclined portion of the pedal arm and is fixed thereto by welding.

2. The pedal apparatus of claim 1, wherein the connecting face of the connection bracket is located on an upper side of the inclined portion of the pedal arm, the upper retaining projection and the lower retaining projection respectively passing through the upper retaining hole and the lower retaining hole from an upper side of the pedal arm.

3. The pedal apparatus of claim 1, wherein at least one of the upper retaining projection and the lower retaining projection is curved in shape.

4. The pedal apparatus of claim 1, wherein at least one of an opening of the upper retaining hole and an opening of the lower retaining hole is larger than a cross-section of the upper retaining projection or a cross-section of the lower retaining projection.

\* \* \* \* \*